US006959496B2

(12) United States Patent
Wilkinson, Jr. et al.

(10) Patent No.: US 6,959,496 B2

(45) Date of Patent: Nov. 1, 2005

(54) BARBECUE COOKING UTENSIL

(76) Inventors: Arland Gray Wilkinson, Jr., 3019 Dogwood La., Fultondale, AL (US) 35068; Peggy W. Wilkinson, 3019 Dogwood La., Fultondale, AL (US) 35068

( * ) Notice: Subject to any disclaimer, the term of this patent is extended or adjusted under 35 U.S.C. 154(b) by 0 days.

(21) Appl. No.: 10/734,347

(22) Filed: Dec. 12, 2003

(65) Prior Publication Data

US 2004/0123469 A1 Jul. 1, 2004

Related U.S. Application Data

(60) Provisional application No. 60/432,774, filed on Dec. 12, 2002.

(51) Int. Cl.[7] .......... A47J 43/28

(52) U.S. Cl. .......... 30/322

(58) Field of Search .......... 30/129, 322, 323

(56) References Cited

U.S. PATENT DOCUMENTS

| | | | | |
|---|---|---|---|---|
| 1,172,333 A * | 2/1916 | Williams | ........ | 30/129 |
| 1,978,532 A * | 10/1934 | Gurnee | ........ | 30/342 |
| 2,669,018 A * | 2/1954 | Smith | ........ | 30/129 |
| 4,332,409 A | 6/1982 | Stachowicz | | |
| 4,539,751 A | 9/1985 | Chan | | |
| 4,734,984 A | 4/1988 | Snell | | |
| 4,844,525 A | 7/1989 | Tarlow | | |
| 5,775,207 A | 7/1998 | Warren | | |
| 6,065,391 A * | 5/2000 | Archard et al. | ........ | 99/342 |
| 6,286,418 B1 | 9/2001 | Berke | | |
| 6,321,408 B1 | 11/2001 | Esterson | | |
| D455,559 S | 4/2002 | Wang | | |

* cited by examiner

*Primary Examiner*—Douglas D Watts
(74) *Attorney, Agent, or Firm*—David P. Lhota, Esq.; Stearns Weaver Miller; Weissler Alhadeff & Sitterson, P.A.

(57) ABSTRACT

A barbeque fork comprises a base or handle, tines, biasing rod, at least one guide for supporting and sliding the rod and a cross-brace or bracket, wherein the rod is supported over and along the top surface of the handle by preferably two guides, the guides projecting outward from the handle and each defining apertures for receiving and guiding the rod when sliding it over the handle. One end of the rod is terminated by a stop or cap that prevents the rod from passing completely through the guides. The cross-brace is diametrically positioned at the opposite end of the rod and engages the food items when the rod is slid forward to support or remove the food items. In an alternative embodiment, the barbeque fork includes a thermometer device for reading the temperature of food items.

17 Claims, 1 Drawing Sheet

BARBECUE COOKING UTENSIL

CROSS REFERENCE TO RELATED APPLICATIONS

This application claims the benefit of provisional patent application Ser. No. 60/432,774 filed Dec. 12, 2002.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

This invention relates generally to a cooking utensil, and more particularly, to a large grilling fork that allows sizable food items commonly prepared on grills and barbecues, such as steaks and other large portioned items, to be grasped and controlled by with a single hand.

2. Description of the Background Art

Conventional barbecue cooking utensils can be difficult to use, especially for large cuts of meat or when cooking with one hand. In addition, meat can easily fall off conventional forks. If a barbecue-cooking utensil existed that made it easier to retrieve and maneuver food items on a grill, it would be well received. The instant invention addresses this unfulfilled need in the prior art by providing a large grilling fork that allows for sizable food items commonly prepared on grills and barbecues to be conveniently grasped and controlled with one-hand.

BRIEF SUMMARY OF THE INVENTION

In light of the foregoing, it is an object of the present invention to provide a cooking utensil that makes convenient and easy to handle food items prepared on barbeque grills.

It is another object of the instant invention to provide a cooking utensil adapted for easily grasping and handling large food items cooked on barbeque grills, such as steaks and chicken, with one hand.

It is also an object of the instant invention to provide a cooking utensil in the form of a large fork that grasps and releases large food items prepared on a grill.

It is an additional object of the instant invention to provide a barbeque fork that simplifies the task of retrieving and accessing food items from a grill and that facilitates use of one hand when handling food on a grill.

It is a further object of the instant invention to provide a barbeque fork that provides leveraged support when handling large food items on a grill or other cooking device.

It is yet another object of the instant invention to provide a barbeque fork that can read the temperature of food items.

In light of these and other objects, the instant invention provides a cooking utensil in the form of a barbeque fork that simplifies the task of retrieving and accessing food items from a grill. The barbeque fork design facilitates operation with one hand. The barbeque fork comprises a base or handle, tines, biasing rod, at least one guide for supporting and sliding the rod and a cross-brace or bracket. The base/handle is elongated and comprises a grip at one end and the tines at the opposite end. The barbeque fork comprises at least one tine and preferably two tines. Preferably two rods support the rod over and along the top or bottom surface of the handle. The guides project outward from the handle and each define apertures for receiving and guiding the rod when sliding it over the handle. One end of the rod is terminated by a stop or cap that prevents the rod from passing completely through the guides. Alternatively, the barbeque fork may comprise one guide or all but one guide includes a slot for removing the rod to facilitate pivoting the rod. The cross-brace is diametrically positioned at the opposite end of the rod and engages the food items when the rod is slid forward to support or remove the food items. In an alternative embodiment, the barbeque fork includes a thermometer device for reading the temperature of food items.

DETAILED DESCRIPTION OF THE INVENTION

Figure 1:
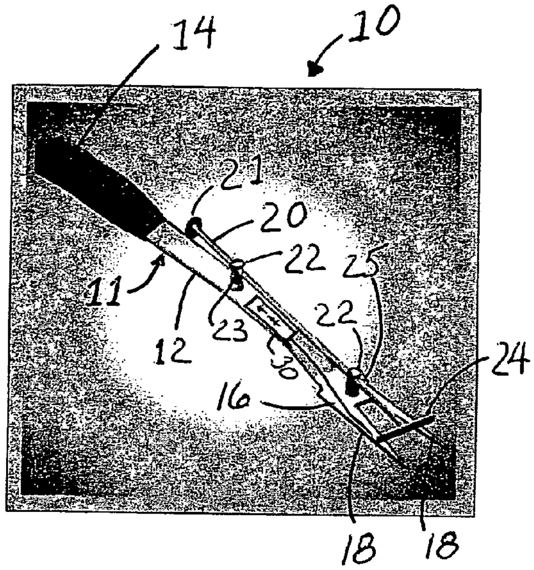
FIG. 1 is a first perspective view of the preferred embodiment of the barbecue fork in accordance with the instant invention.
Figure 2:
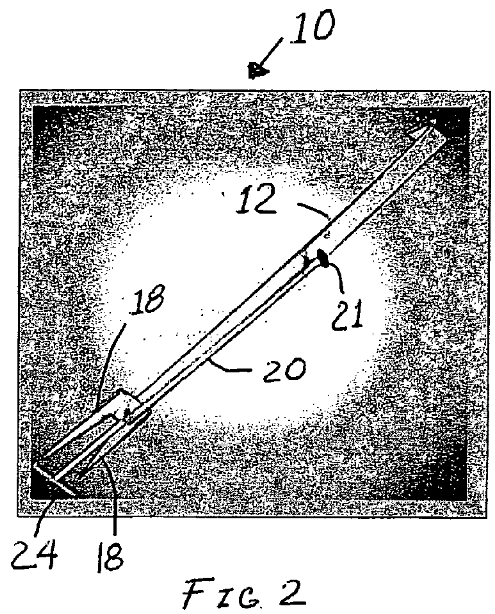
FIG. 2 is a perspective view of another embodiment of the barbecue fork in accordance with the instant invention.
Figure 3:
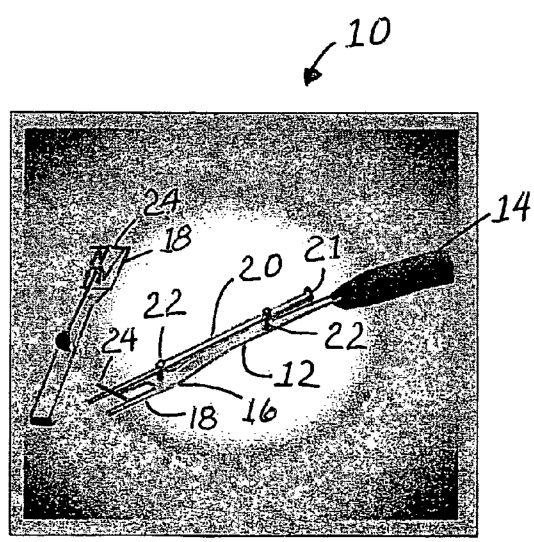
FIG. 3 is a perspective view of the preferred and alternative embodiments of the barbecue fork in accordance with the instant invention.
Figure 4:
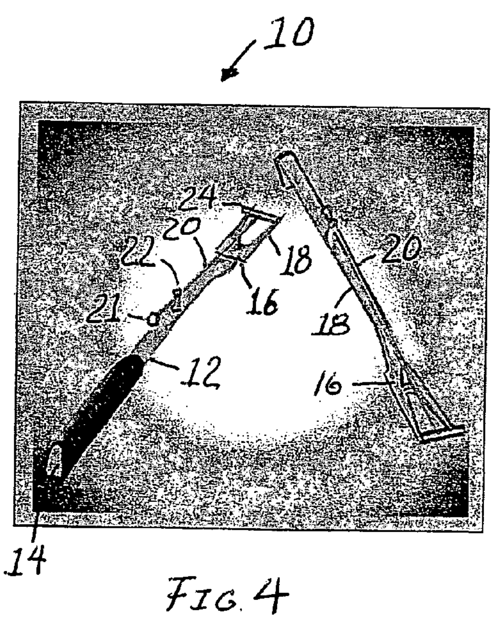
FIG. 4 is a perspective view of the preferred and alternative embodiments of the barbecue fork in accordance with the instant invention.

With reference to the drawings, FIGS. 1 to 4 depict the preferred and alternative embodiments of the instant invention, which is generally referenced as a personal a barbecue fork and, or by numeric character 10. Referring to FIGS. 1 to 4, the barbecue fork 10 generally comprises a barbecue fork base or handle 12, a rod 20 slidably supported to the base 11 by at least one guide 22 and a cross-brace or bracket 24 at the end of the rod 20 proximal the tines 18. The barbecue fork 10 preferably comprises at least two guides 22 with hollow openings or apertures 23 for passing, supporting and guiding the rod 20. The base 11 of the fork 10 comprises the handle 12 and dual tine head 16. The handle 12 portion of the base 11 is approximately one-half inch in width (½") and approximately nine inches (9") in length and the dual tine head 16 preferably comprises two tines 18 and is approximately two-inches (2") wide and three inches (3") long. The handle 12 and tine head 16 together are approximately twelve-inches (12") in length. The handle 12 preferably includes a grip 14 to provide an improved gripping surface.

The metal rod 20 is supported on the lower side of the handle 12, but may be supported on the upper side in an alternative embodiment. The metal rod 20 is preferably approximately three-thirty-seconds of an inch (3⁄32") to a quarter inch (¼") in diameter and approximately seven inches (7") in length. The metal rod 20 is preferably placed in position to run approximately parallel to or over the handle 12 at a point starting approximately three-and-onehalf inches (3½") from the grip 14 or gripping end. The guides 22 are preferably hollow and have approximately a one-quarter-inch (¼") span. The guides 22 are preferably affixed to the lower side of the handle 12 and secure the placement of the metal rod 20 to the handle 12. The fork 10 may use one guide 22 to allow the rod 20 to pivot up and down and left and right. In the preferred embodiment, the fork 10 includes a plurality of guides 22 to prevent rotational movement. In embodiments having a plurality of guides 22, all but one guide 22 may have a slot 25 or other structure for removing the rod 20.

A round cap or stop 21 terminates the end of the rod 20 proximal the grip 14 to prevent the rod 20 from pulling out of or passing completely through the guides 22. The opposite tine-facing end of the rod 20 supports the cross-bracket 24. The cross-bracket 24 is approximately two-inch (2") in length and one-half-inch (½") in height, and is attached to the rod 20 at approximately ninety-degrees with reference to the rod 20.

The barbecue fork 10 provides a convenient tool for the handling of food items prepared on grills and barbecue pits. The barbecue fork 10 simplifies the task of retrieving and accessing food items from a grill and allows it to be done with one hand. The rod 20 and cross bracket 24 provide additional support to allow the fork 10 to independently hold food items. Food is released by pushing the rod 20 with the bracket 24 against the meat and returning it to its original position.

The fork 10 can be made with a stainless steel, wooden or plastic handle 12, which can also be encased within a plastic or rubber grip piece, such as the grip 14. The push rod of the barbecue fork 10 can be made of a metal or durable plastic material, and the entire fork 10 can be made in various sizes. All parts of the barbecue fork 10 (e.g. handle, tine head, rod, guides, attachment cap and bracket) are preferably made of 1810 stainless steel material. In an alternative embodiment, a thermometer device 30 may be incorporated with or in the handle of the barbeque fork 10 to check the temperature of the meat. The thermometer 30 preferably includes a temperature probe in at least one of the tines 18.

To use the fork 10, the user of the simply inserts the tines 18 into the desired food item, and its rod 20 maneuvers to allow the bracket 24 to be positioned and provide additional weight support beneath the food item. The user then pushes the rod 20 forward to cause the release of the attached food item.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. A barbeque fork for holding and removing food items, said fork comprising:

a handle;

a tine head on a first end of said handle, said tine head having at least one tine;

a rod slidably supported on said handle, said rod comprising means for engaging food items on said tine head and means for preventing said rod from pulling free from said handle;

two guides for slidably supporting said rod on said handle, said guides having an aperture for slidably receiving said rod; and a slot defined by one of said guides.

2. A fork as recited in claim 1, wherein said means for slidably supporting said rod comprises:

at least one guide having an aperture for slidably receiving said rod.

3. A fork as recited in claim 2, wherein said means for slidably supporting said rod comprises:

two guides.

4. A fork as recited in claim 3, wherein said means for slidably supporting said rod comprises:

a slot defined by one of said guides for facilitating removal of said rod from said slotted guide such that said rod is able to pivot.

5. A fork as recited in claim 1, wherein said means for engaging food comprises:

a cross-brace that is approximately perpendicular to said rod.

6. A fork as recited in claim 1, wherein said means for preventing said rod from pulling free comprises a stop on said rod having a width that is larger that the width of said rod.

7. A fork as recited in claim 1, further comprising:

means for determining the temperature of the food items.

8. A fork as recited in claim 7, wherein said temperature determining means comprises:

a thermometer having a temperature probe operatively associated with said tine head.

9. A fork as recited in claim 1, further comprising:

a rubber based grip on said handle.

10. A barbeque fork for holding and removing food items, said fork comprising:

a handle;

a tine head on a first end of said handle, said tine head having at least one tine;

a rod slidably supported on said handle, said rod comprising means for engaging food items on said tine head and means for preventing said rod from pulling free from said handle; said food engaging means being slidably disposed along an independent plane over and substantially parallel to a top surface of said tine;

two guide posts for slidably supporting said rod on said handle, said guide posts having an apertures for slidably receiving said rod to facilitate movement of said rod across said handle and sliding said food engaging means; and a slot defined by one of said guides for facilitating removal of said rod from said slotted guide such that said rod is able to pivot.

11. A fork as recited in claim 10, wherein said means for slidably supporting said rod comprises:

at least two guides for facilitating controlled lateral movement.

12. A fork as recited in claim 11, wherein said means for slidably supporting said rod comprises:

a slot defined by one of said guides for facilitating removal of said rod from said slotted guide such that said rod is able to pivot.

13. A fork as recited in claim 10, wherein said means for engaging food comprises:

a cross-brace that is approximately perpendicular to said rod.

14. A fork as recited in claim 10, wherein said means for preventing said rod from pulling free comprises a stop on said rod having a width that is larger than the width of said rod.

15. A fork as recited in claim 10, further comprising:

means for determining the temperature of the food items.

16. A fork as recited in claim 15, wherein said temperature determining means comprises:

a thermometer having a temperature probe operatively associated with said tine head.

17. A fork as recited in claim 10, further comprising: a rubber based grip on said handle.

* * * * *